United States Patent
Kleinpeter et al.

(10) Patent No.: US 10,290,019 B2
(45) Date of Patent: May 14, 2019

(54) USER RE-ENGAGEMENT WITH ONLINE PHOTO MANAGEMENT SERVICE

(71) Applicant: Dropbox, Inc., San Francisco, CA (US)

(72) Inventors: Thomas Kleinpeter, San Francisco, CA (US); Zachary Kagin, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 426 days.

(21) Appl. No.: 14/565,298

(22) Filed: Dec. 9, 2014

(65) Prior Publication Data

US 2016/0117344 A1    Apr. 28, 2016

Related U.S. Application Data

(60) Provisional application No. 62/068,572, filed on Oct. 24, 2014.

(51) Int. Cl.
    *G06Q 30/02*      (2012.01)
    *H04L 12/58*      (2006.01)
    *G06F 16/174*     (2019.01)
    *G06F 16/2457*    (2019.01)

(52) U.S. Cl.
    CPC ..... *G06Q 30/0255* (2013.01); *G06F 16/1748* (2019.01); *G06F 16/24578* (2019.01); *G06Q 30/0251* (2013.01); *H04L 51/043* (2013.01); *H04L 51/046* (2013.01)

(58) Field of Classification Search
    None
    See application file for complete search history.

(56) References Cited

U.S. PATENT DOCUMENTS

| | | | |
|---|---|---|---|
| 7,669,136 B1 | 2/2010 | Gaware | |
| 8,014,583 B2 | 9/2011 | Zahniser | |
| 8,210,849 B1 * | 7/2012 | Murphy-Aniceto | G09B 19/0092 434/127 |
| 8,290,281 B2 | 10/2012 | Xiao | |
| 8,321,274 B2 | 11/2012 | Collins et al. | |
| 8,538,093 B2 | 9/2013 | Kodesh | |
| 8,577,872 B2 | 11/2013 | Schokking et al. | |
| 8,766,793 B2 | 7/2014 | Elumalai | |
| 2011/0052097 A1 | 3/2011 | Sundstrom | |
| 2012/0066573 A1 * | 3/2012 | Berger | H04N 1/00196 715/202 |

(Continued)

OTHER PUBLICATIONS

Potter, Personalized emails will make your customers even happier, May 2014, accessed Apr. 13, 2017 at http://web.archive.org/web/20140525012630/http://customer.io/blog/personalized-emails-for-successful-campaigns.html.*

(Continued)

*Primary Examiner* — William Spieler
(74) *Attorney, Agent, or Firm* — Keller Jolley Preece

(57) ABSTRACT

An online photo management service that stores a collection of photos belonging to a user can send re-engagement messages to the user that can include photos automatically selected from the collection. The selection can be based on a scoring algorithm that rates the photos according to a set of attributes and computes a score based on the attributes and a set of weights. Based on user responses to re-engagement messages, the weights can be tuned to more reliably select photos likely to result in user re-engagement with the stored collection of photos.

20 Claims, 6 Drawing Sheets

(56) References Cited

U.S. PATENT DOCUMENTS

| | | | |
|---|---|---|---|
| 2013/0066872 A1* | 3/2013 | Moritz | G06F 17/30244 |
| | | | 707/737 |
| 2013/0151523 A1 | 6/2013 | Hsi | |
| 2013/0325755 A1* | 12/2013 | Arquette | H04L 51/32 |
| | | | 706/12 |
| 2014/0201027 A1 | 7/2014 | Bhardwaj | |
| 2014/0222755 A1* | 8/2014 | Soderberg | G06F 17/30265 |
| | | | 707/609 |

OTHER PUBLICATIONS

Cambria, Erik, et al., "Sentic Album: Content-, Concept-, and Context-Based Online Personal Photo Management System," Cogn Comput, 2012, vol. 4, pp. 477-496.

* cited by examiner

| Category | Attribute |
|---|---|
| Esthetics | a1: Brightness |
| | a2: Contrast |
| | a3: Color diversity |
| | a4: Focus/sharpness |
| Content | a5: % occupied by faces |
| | a6: % occupied by food item |
| | a7: % occupied by text |
| | a8: Frequency of photos of subject |
| Location | a9: Frequency of visiting location |
| | a10: Pattern of visiting location |
| | a11: Number of photos taken during visit |
| Time | a12: Annual clustering of photos |
| Crowdsourcing | a13: Number of users with photos from same location & time |
| | a14: Number of users with photos from same location |
| | a15: Acquaintances with photos from same location & time |
| History | a16: Image source |
| | a17: Previously shared |
| | a18: Previously edited |
| | a19: How stored (folder name, other files in folder) |
| | a20: Previous response from user |

FIG. 4

USER RE-ENGAGEMENT WITH ONLINE PHOTO MANAGEMENT SERVICE

CROSS-REFERENCE TO RELATED APPLICATIONS

This application claims the benefit of U.S. Provisional Application No. 62/068,572 filed Oct. 24, 2014, titled "User Re Engagement With Online Photo Management Service," the disclosure of which is incorporated by reference herein in its entirety.

BACKGROUND

This disclosure relates generally to online photo management services and in particular to fostering user re-engagement with an online photo management service.

The advent of compact digital cameras that can be incorporated into a mobile phone or other device that users carry during daily activities has revolutionized photography. Users take photos anywhere and everywhere, and they take more photos than ever before. Because digital image files can be quite large, one great challenge for the prolific photographer relates to storing the many photos they take. Various online services have emerged to facilitate storage of digital photos. Users can upload photos to these services, which promise long-term secure storage.

SUMMARY

An online photo management service can provide online storage, synchronization, and sharing of photos taken by users. For example, a user can establish an account with the service and can upload photos to the account. The service can store the uploaded photos indefinitely and can allow the user to access stored photos via various clients (e.g., web browsers, mobile or desktop application programs, or the like). The clients can support user interactions such as uploading photos; viewing, sorting, editing, annotating, or deleting uploaded photos; sharing photos with others; and so on. In some instances, the service can support automatic uploading of new photos that are taken by the user's camera device.

While users find online photo management services convenient for uploading and storing photos, it is often the case that photos are uploaded and forgotten; they are out of sight and therefore out of mind. Consequently, users may miss out on opportunities to engage with their photos, for instance by reviewing old photos and reliving fond memories, or by sharing interesting or significant photos with friends.

Certain embodiments of the present invention relate to techniques for prompting users to re-engage with photos that they have previously uploaded to an online photo management service. For example, the service can keep track of whether and how often a user engages with uploaded and stored photos. When a pattern of inactivity is detected, the service can generate messages to the user, such as email messages or push notifications, to prompt the user to re-engage with the service. The message can include one or more of the user's stored photos, with the selection of photos to include being made by an automated intelligent agent that can evaluate the photos to identify photos likely to interest the user in re-engaging with the service. For instance, the selected photos may inspire the user to view additional stored photos and/or to share photos with others.

The automated intelligent agent can rate photos based on a number of different attributes. For example, esthetic attributes such as brightness, contrast, color diversity, and focus can each be assigned a rating (e.g., a real number between 0 and 1). As another example, a subject depicted in the photo (including but not limited to human or animal faces) can be identified, and an attribute rating can be assigned based on assumptions or empirical data regarding users' likely interest level in revisiting photos of the identified subjects. As still another example, the time and place where the photo was taken can be considered and a rating assigned based on assumptions or empirical data regarding users' likely interest level in photos having similar properties (e.g., photos taken in locations the user does not frequently visit or photos taken in locations where many users take photos may correlate with higher user interest). Other attributes, such as the number or relative frequency of photos taken by the user of a particular subject or in a particular location or near a particular time, can also be rated.

Once the ratings for various attributes have been assigned, the automated intelligent agent can compute a score for the photo. The score can be, for example, a weighted average of the ratings. The weights can be determined or optimized using a machine-learning algorithm that can be trained based on user response to previous messages. A feedback loop can be implemented, in which messages including selected photos are sent, user responses are measured, and the weights are tuned based on the responses and the attributes of the photos included in the messages. Through the operation of the feedback loop, attributes that strongly correlate with a positive user response will tend to become highly weighted. In some embodiments attributes that correlate with negative user response can be given negative weight.

In some embodiments, a server can store a collection of photos belonging to a user. The photos can be scored based on a set of attributes of the photo and a set of weights assigned to the attributes. The scoring function can incorporate linear or nonlinear weighting of attributes as desired. Based at least in part on the score, the server can select one or more of the scored photos as representative photos, and the representative photos can be included in a re-engagement message (e.g., email, text message, push notification) to the user. If multiple photos are to be included, the selection of representative photos can include a deduplication operation to remove photos that are similar to each other, increasing the diversity of the sample sent to the user.

Re-engagement messages can be sent as desired, for example, when it is determined that the user has not engaged with stored photos (e.g., by viewing or sharing at least some of the photos) for at least a minimum period of time.

When a re-engagement message is sent, the server can monitor user response to determine whether and how the user responds; for instance, the user might respond positively by launching a client app to engage with the stored photos or by indicating approval of the received message, or the user might respond negatively by indicating disapproval of the received message. Such user responses can be used as feedback to modify the set of weights assigned to the attributes, thereby improving the selection of photos for future re-engagement messages. In some embodiments, the feedback can be aggregated across a population of users.

The following detailed description together with the accompanying drawings will provide a better understanding of the nature and advantages of the present invention.

BRIEF DESCRIPTION OF THE DRAWINGS

FIG. 4 shows a table listing attributes that can be used according to an embodiment of the present invention.

DETAILED DESCRIPTION

Certain embodiments of the present invention relate to techniques for prompting users to re-engage with photos that they have previously uploaded to an online photo management service. For example, the service can keep track of whether and how often a user engages with uploaded and stored photos. When a pattern of inactivity is detected, the service can generate messages to the user, such as email messages or push notifications, to prompt the user to re-engage with the service. The message can include one or more of the user's stored photos, with the selection of photos to include being made by an automated intelligent agent that can evaluate the photos to identify photos likely to interest the user in re-engaging with the service. For instance, the selected photos may inspire the user to view additional stored photos and/or to share photos with others.

The automated intelligent agent can rate photos based on a number of different attributes. For example, esthetic attributes such as brightness, contrast, color diversity, and focus can each be assigned a rating (e.g., a real number between 0 and 1). As another example, a subject depicted in the photo (including but not limited to human or animal faces) can be identified, and an attribute rating can be assigned based on assumptions or empirical data regarding users' likely interest level in revisiting photos of the identified subjects. As still another example, the time and place where the photo was taken can be considered and a rating assigned based on assumptions or empirical data regarding users' likely interest level in photos having similar properties (e.g., photos taken in locations the user does not frequently visit or photos taken in locations where many users take photos may correlate with higher user interest). Other attributes, such as the number or relative frequency of photos taken by the user of a particular subject or in a particular location or near a particular time, can also be rated.

Once the ratings for various attributes have been assigned, the automated intelligent agent can compute a score for the photo. The score can be, for example, a weighted average of the ratings. The weights can be determined or optimized using a machine-learning algorithm that can be trained based on user response to previous messages. A feedback loop can be implemented, in which messages including selected photos are sent, user responses are measured, and the weights are tuned based on the responses and the attributes of the photos included in the messages. Through the operation of the feedback loop, attributes that strongly correlate with a positive user response will tend to become highly weighted. In some embodiments attributes that correlate with negative user response can be given negative weight.

Figure 1:
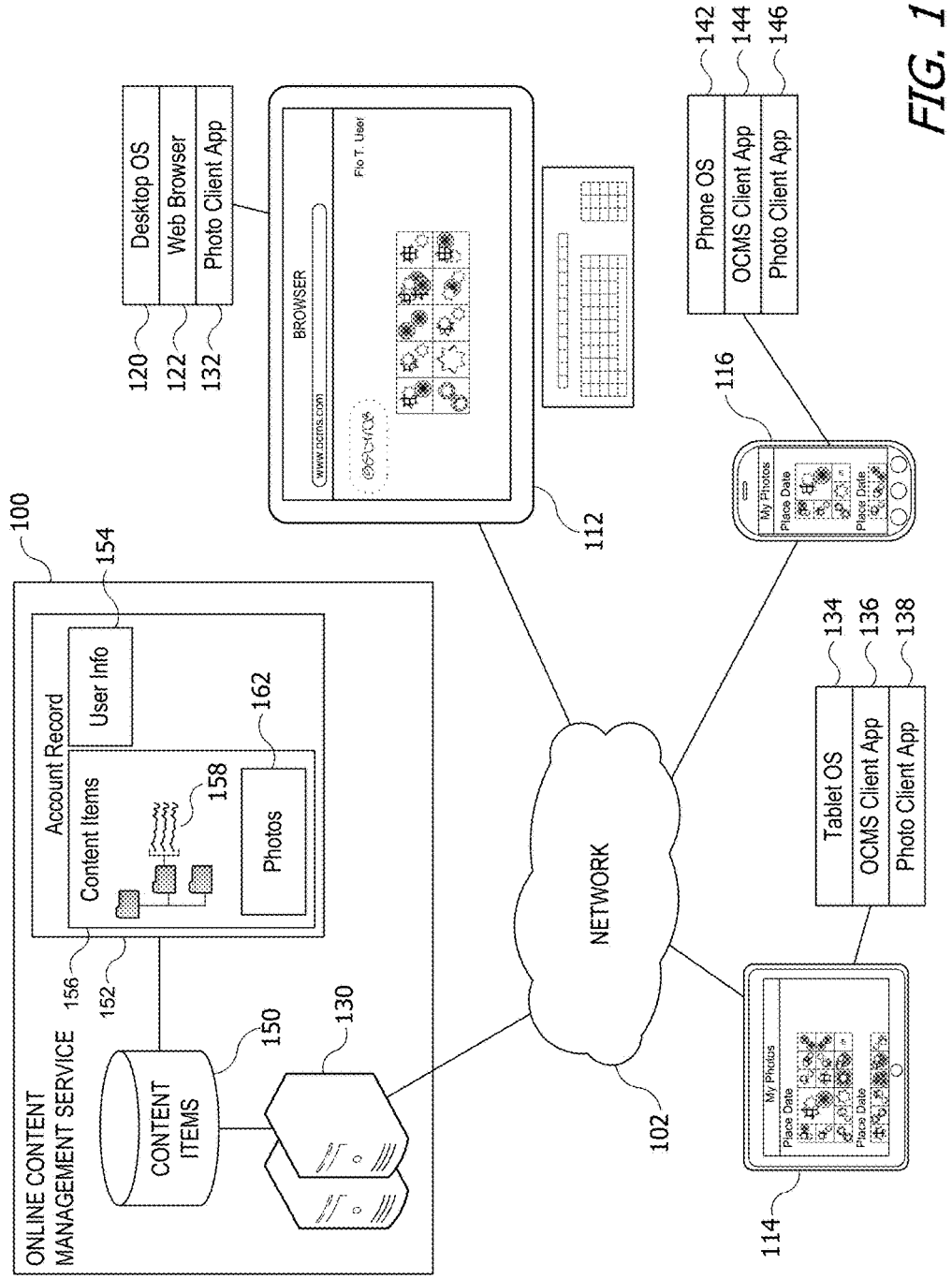
FIG. 1 shows user devices interacting with an online content management service according to an embodiment of the present invention.

FIG. 1 shows user devices interacting with an online content management service 100 according to an embodiment of the present invention. Online content management service (sometimes abbreviated as "OCMS") 100 can include, for example, a photo storage and sharing service, a file storage and sharing service, a social media service that allows users to post and edit messages and/or other content, and so on. In some embodiments, online content management service 100 can be an online photo management service that provides photo storage, sharing, and synchronization for users across multiple devices and/or platforms and that can also provide storage, sharing, and synchronization of other types of content. Other types of content can also be stored, shared, and synchronized. Online content management service 100 can be hosted on servers 130 maintained by a service provider and accessed via a network 102, such as the Internet.

Users can access online content management service 100 using various application programs executing on user devices such as a desktop (or laptop) computer 112, tablet computer 114, and/or smart phone 116 In general, different user devices 112, 114, 116 can implement different operating platforms (a "platform" refers to a combination of hardware and operating system software). The provider of online content management service 100 and/or various third parties can provide application programs (also referred to herein as "apps") adapted to various platforms; application programs are generally programs that are launchable on request of the user, although some applications may also be automatically launched under some circumstances. In embodiments described herein, some or all application programs can allow the user to access photos (and optionally other content) stored on online content management service 100; such access can include viewing stored photos, sharing stored photos with other users, adding photos, deleting photos, modifying photos, and/or organizing photos.

For example, desktop computer 112 can implement a desktop operating system ("OS") 120 and various applications that are executable on desktop OS 120, such as web browser 122. Web browser 122 (which can be, e.g., Internet Explorer® (a product of Microsoft Corp.), Google Chrome® (a product of Google Inc.), Safari® (a product of Apple Inc.), or similar software) can be operable to interact with various servers via network 102, including servers 130 associated with online content management service 100. In some embodiments, web browser 122 can interact with servers 130 to execute a browser-based photo client app 132 that can access photos (and optionally other content items) stored for the user by online content management service 100. Program code implementing browser-based photo client app 132 can be stored on desktop computer 112 or delivered to desktop computer 112 on an as-needed basis by servers 130; for example, code implementing photo client app 132 can be downloaded when browser 122 accesses servers 130.

As another example, tablet computer 114 can implement a tablet OS 134 (e.g., the Android® operating system (a product of the Open Handset Alliance), Apple's iOS operating system, or the like) and various apps that are executable on the tablet OS. These apps can include a photo client app 136 that allows the user to access photos (and optionally other content items) stored for the user by online content management service 100. Other apps can also be present.

Similarly, smart phone 116 can implement a phone OS 142 (e.g., Android, iOS, or the like) and various apps that are executable on the phone OS. These apps can include a photo client app 144 that allows the user to access photos (and optionally other content items) stored for the user by online content management service 100. Other apps can also be present.

Online content management service 100 can manage a data store 150 of content items. In some embodiments, some or all of the content items in data store 150 are "owned" by particular users and are visible only to that user and potentially others to whom the user has granted access (e.g., by designating certain content items as shared with other users). For example, in one implementation, content items data store 150 can be organized around records of user accounts, such as account record 152. Account record 152 can be associated with a unique user identifier and can include user information 154 (e.g., user name, password, email address) and information 156 about content items 158 that have been stored by the account's user in data store 150. In some embodiments, information 156 may include the actual content items 158; in other embodiments, information 156 may provide references to locations where actual content items 158 are stored. The stored content items can include photos 162 that have been uploaded by the user. In some embodiments, photos 162 can be indexed separately from other content items 158. This can facilitate accessing photos separately from other types of content items. For instance, a photo client app (such as app 138 or 146) can be specifically designed to provide a user interface for browsing and viewing a collection of photos 162 without also showing other types of content items 158 that may be stored for the user by online content management service 100. An example is the Carousel photo client app provided by Dropbox, Inc.

In operation, a user may establish an account with online content management service 100; this can involve, e.g., creating user account record 152. Once the account is established, the user can access the account from any device (including any of devices 112, 114, 116) by using a suitable client app (e.g., any of client apps 132, 136, 138, 144, 146). Accessing the account can include, e.g., providing appropriate credentials (e.g., a username and password) through a user interface of the client app. In some embodiments, a persistent link between the client app and the account can be established when the user first enters credentials; accordingly, the user need not be prompted to enter credentials each time a client app is launched.

Using a client app, a user can view, modify, add, and/or delete photos 162 (and optionally other content items 158) associated with the user's account record 152. In the case of photos 162, some embodiments allow the user to configure a client device (e.g., mobile phone client 116 or tablet client 118) such that any photos taken using an on-board camera of the client device, or an external camera connected to the client device, are automatically uploaded to online content management service 100 without the user needing to launch a client app. In some embodiments, a photo client app can also allow the user to organize photos 162, e.g., using a folder hierarchy or other structures. In some embodiments, online content management service 100 can automatically organize photos 162 for the user, e.g., based on dates and/or locations where photos were taken. In some embodiments, a photo client app can also provide an interface allowing the user to selectively share photos (and other content items) with other users.

It will be appreciated that the systems shown in FIG. 1 are illustrative and that variations and modifications are possible. User devices can include any type of user-operable computing device and are not limited by form factor, particular hardware components, operating systems, or the like. Any app or combination of apps can be installed or supported on a given user device, and different user devices may have the same apps, similar apps, and/or different apps or combinations of apps. Any type of content item can be stored and managed using online content management service 100, including but not limited to photos. Online content management service 100 can organize the photos and other information it stores in any manner desired and can store photos and other information locally (e.g., at a central data and server warehouse facility) or in a distributed manner.

Using clients such as clients 112, 114, 116, users can upload photos 162 to online content management service 100. In some instance, one or more of clients 112, 114, 116 (or other clients) can have an onboard or connected camera and can be configured to automatically upload photos taken with the onboard or connected camera to online content management service 100. Depending on implementation, the number of photos 162 a particular user stores on online content management service 100 can become quite large (e.g., thousands of photos). Users may lose track of how many or what photos 162 they have stored on online content management service 100. As a result, users may miss opportunities to enjoy the benefits of online photo storage and sharing, such as the ability to view old photos that may trigger fond memories, the ability to share photos with other users, and so on.

Certain embodiments of the present invention can prompt user re-engagement with photos 162 stored on online content management service 100 by sending appropriately timed messages to the user. Each message can include a sampling of stored photos 162 that may be of interest to the user.

Figure 2:
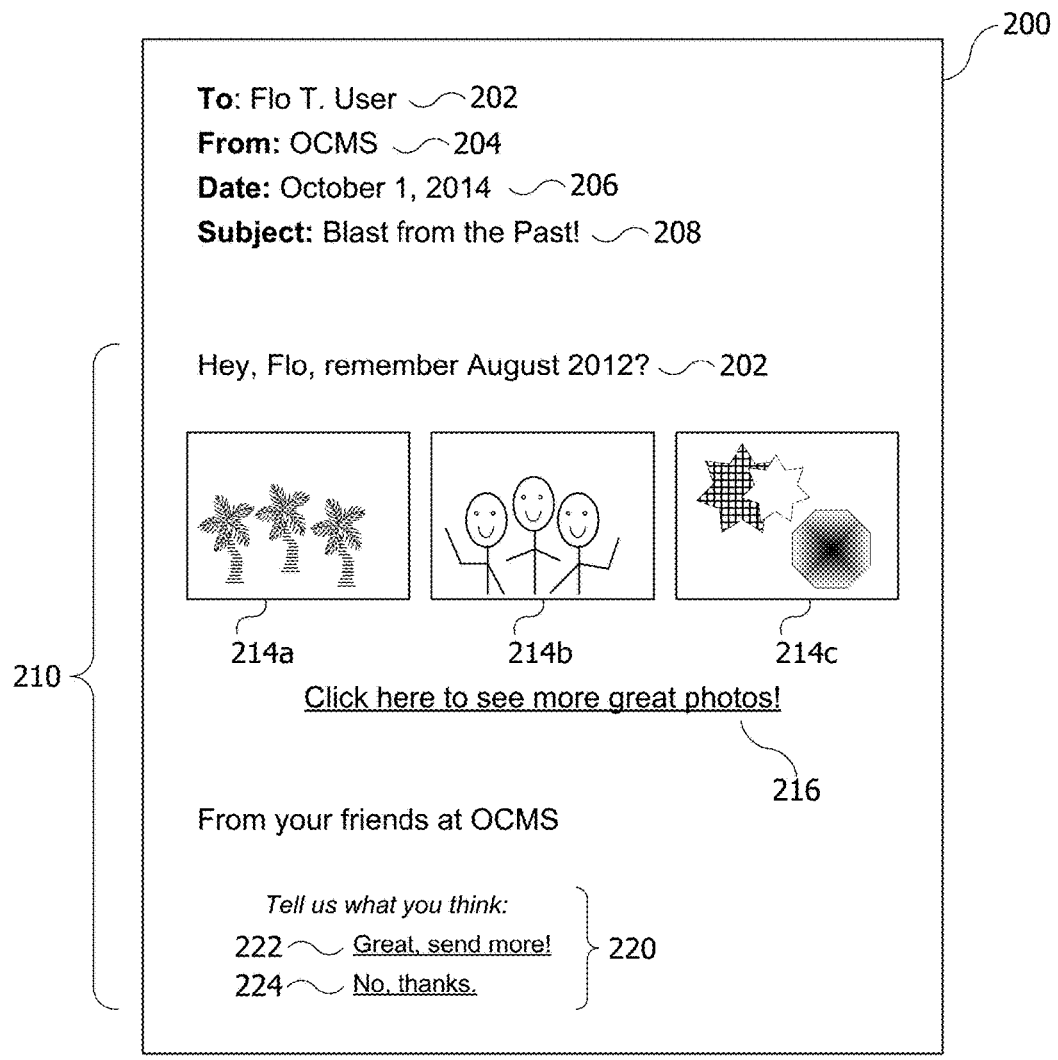
FIG. 2 shows an example re-engagement message according to an embodiment of the present invention

FIG. 2 shows an example re-engagement message 200 that can be generated (e.g., by online content management service 100) according to an embodiment of the present invention. In this example, message 200 is shown as an email message, although other message formats can be used, including SMS/MMS messages, push notifications (e.g., to a mobile client device), and so on.

Message 200 can be addressed to a user 202 who has previously uploaded photos to online content management service 100. In some embodiments, message 200 can be generated if the user has previously uploaded photos and subsequently lapsed into inactivity, e.g., by not using a photo client app, such as any of apps 132, 138, 146 of FIG. 1, to access stored photos for an extended period of time. Message 200 can include other standard email message headers, such as a sender 204 (which can be an address identifying online content management service 100), date 206, and subject line 208. In some embodiments, subject line 208 can be chosen to entice the user into opening the message.

Message body 210 can include a greeting 212, photos 241a-c, and an action link 216. Greeting 212 can be a personalized greeting and can incorporate information about the photos (e.g., when the photos were taken). Action link 216 can be a clickable link or other user-operable control that allows the recipient of the email to launch a client app (e.g., any of apps 132, 138, 146) to view and interact with photos stored on online content management service 100. For instance, action link 216 can be a hyperlink with an associated URL referencing a location of a client app.

Photos 214a-c can be selected from photos 162 that were previously uploaded to online content management service 100 by user 202. The selection can be made using an automated intelligent agent, according to selection criteria that can be tuned to maximize the likelihood that the user will respond to seeing photos 214a-c by clicking on action link 216. Specific examples of selection criteria and techniques for tuning the criteria are described below. While three photos 214*a-c* are shown, any number of photos can be included (e.g., just one photo, six photos, eight photos, a dozen photos, etc.).

Message body 210 can also include a feedback section 220, which can allow the user to respond without launching the client app. For example, positive feedback option 222 and negative feedback option 224 can be clickable hyperlinks to system-level content items (e.g., web pages) stored on online content management service 100. The linked system-level content items can contain text or graphics providing confirmation that the feedback was received. In the case of positive feedback option 222, the content item can include a link to launch a client app to view the user's photos. Online content management service 100 can thus collect user responses based on user selection of options 222 or 224 as a byproduct of receiving the content request when the user selects option 222 or 224.

It will be appreciated that message 200 is illustrative and that variations and modifications are possible. A re-engagement message can include any type of message that can be sent using a messaging channel that supports the inclusion of images in messages (e.g., email, SMS/MMS, some push notification services, etc.). The content and arrangement of elements can be varied, and the number of photos included can depend on the messaging channel used (e.g., SMS/MMS may be limited to one image per message). Depending on the messaging channel and other design considerations, more or fewer elements than those shown can be included.

Figure 3:
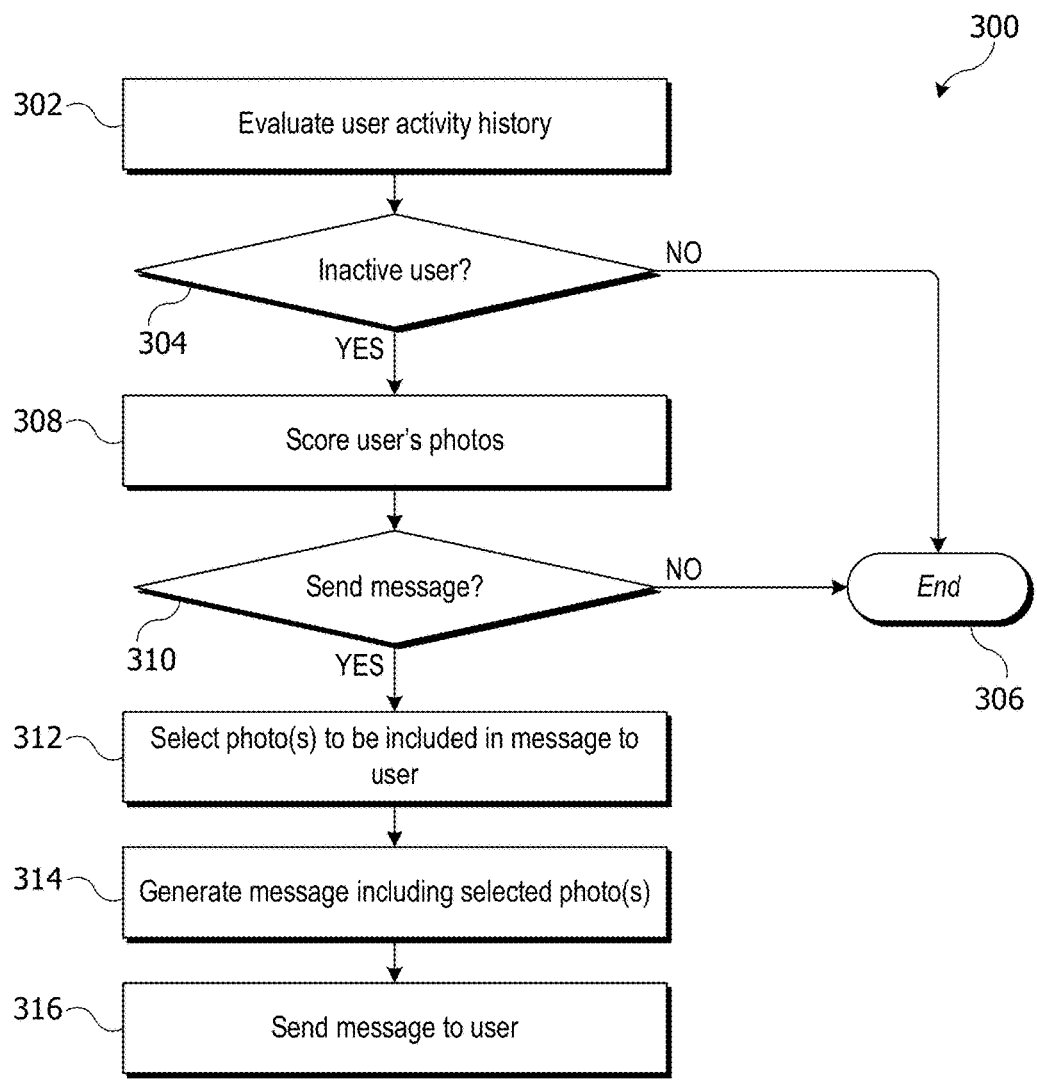
FIG. 3 shows a flow diagram of a process that can be used to generate a re-engagement message according to an embodiment of the present invention.

FIG. 3 shows a flow diagram of a process 300 that can be used to generate a re-engagement message (e.g., message 200) according to an embodiment of the present invention. Process 300 can be implemented by an online photo management service, e.g., on servers 130 of FIG. 1. Process 300 can be used to determine whether to send a re-engagement message to a particular user and to generate the message if it is determined that a message should be sent.

At block 302, process 300 can evaluate a user activity history for a particular user. For example, online content management service 100 can maintain activity logs with information indicating when a particular user interacts with online content management service 100 and specific interaction details, such as whether the interaction included uploading photos, viewing photos, sharing photos, organizing or managing stored photos, or any other interaction with stored photos 162. The interaction information can also be indicative of which client app was used for the interaction.

At block 304, based on the user activity history, process 300 can determine whether the user meets is considered inactive. Various criteria can be applied. For example, an inactive user can be one who has previously uploaded photos 162 to online content management service 100 and has launched a photo client app at least once, but who has not launched a photo client app to interact with photos 162 for at least a minimum time period (e.g., two months, six months, a year, or some other interval). In some embodiments, whether the user has uploaded photos without launching a client app (e.g., through an automatic upload from the client device) is not considered in determining whether the user is active; in other embodiments, upload activity can be considered.

If the user is not considered inactive, then at block 306, process 300 can end without generating a message to the user.

If, at block 304, the user is considered inactive, then it may be desirable to send a re-engagement message to the user. As described above, the message can include selected photos that the user has previously uploaded.

Selection of photos can be based on a scoring algorithm, and at block 308 the scoring algorithm can be applied to score some or all of the user's photos. Specific examples of scoring algorithms are described below with reference to FIG. 4. The score can be represented as a single numerical value (e.g., a real number in a range from 0 to 1) reflecting an assessment of likelihood that the photo will elicit a positive user response.

At block 310, process 300 can determine whether to send a message to the user. The determination can be based on the user activity history as well as whether the user has any photos that meet or exceed a minimum threshold score. The threshold score can be selected based on assumptions or statistics about the minimum score needed to correlate with an acceptable likelihood of a positive user response. If no photos (or too few photos) exceed the threshold score, then no message is to be sent at this time, and process 300 can end at block 306.

At block 312, if a message is to be sent, one or more photos to be included in the message can be selected. The selected photos can include any photos that were previously uploaded (manually and/or automatically) to the account of the user to whom the message is being sent. The number (N) of photos can be chosen as desired (e.g., 1 photo, 3 photos, 6 photos, etc.) and can depend on the messaging channel used. The selection of the photo(s) to include can be based in part on the scores determined at block 308. In some embodiments, it may be desirable not to simply select the N highest-scoring photos. For example, a user might take multiple photos of the same subject in quick succession, resulting in a number of photos that may be very similar in all relevant attributes. Such photos would all tend to have very similar scores. If these happen to be high scores, then selecting the N highest-scoring photos can result in a duplicative set of photos being presented to the user, which may not elicit much interest. Accordingly, the selection of photos can include a deduplication analysis. For example, the highest-scoring photo can be selected first. The second highest-scoring photo can be compared to the first (e.g., based on some or all of the attributes that contribute to the score); if it is too similar, the second highest-scoring photo can be excluded as duplicative. Proceeding in this manner, it is possible to select the N highest-scoring photos that are not duplicative of each other. Other criteria can also be applied, such as criteria based on age of the photos (e.g., preferring photos taken close to an integer number of years ago).

At block 314, the message can be generated. Generating the message can include generating message headers (e.g., headers 202, 204, 208 for message 200 of FIG. 2), generating text elements (e.g., greeting 212, action link 216, feedback section 220), inserting and positioning the selected photos within the message body, and so on. At block 316, the message can be sent to the user.

It will be appreciated that process 300 is illustrative and that variations and modifications are possible. Steps described as sequential may be executed in parallel, order of steps may be varied, and steps may be modified, combined, added or omitted. Process 300 can be performed independently for each user of online content management service 100, e.g., at regular intervals (weekly, monthly, quarterly, etc.). In some embodiments, when determining whether to send a re-engagement message to a particular user, the elapsed time since the last re-engagement message was sent can be considered. Other considerations can include, e.g., whether and how the user has responded to previous re-engagement messages. The techniques used to decide whether and when to send a re-engagement message to a particular user can be varied as desired. In some embodiments, regardless of any other considerations, a re-engagement message is not sent if the user does not have at least one stored photo that meets a minimum score threshold.

The particular selection of photos can influence the user's response to the re-engagement message. For instance, it is expected that a user who receives photos that evoke fond memories or are esthetically appealing will be inclined to respond positively, e.g., by launching the client app to view additional photos related to that memory or by providing positive feedback using feedback option 222. A user who receives photos that are uninteresting or esthetically unappealing will likely be less inclined to respond positively. Accordingly, certain embodiments can provide scoring algorithms specifically designed to select photos that maximize the likelihood of a positive response.

In some embodiments, each photo can be independently rated with respect to each of a number of different attributes. Each rating can be, for example, a real-valued numerical rating on a scale from 0 to 1, and the rating process can be automated. The score for a photo can be computed as a weighted average of the attribute ratings, with weights determined using machine-learning techniques as described below.

Any number or combination of attributes can be rated and incorporated into a score. FIG. 4 shows a table 400 listing attributes that can be used according to an embodiment of the present invention. The attributes are grouped into categories to facilitate description; however, it is to be understood that each attribute can be rated independently and that all attributes need not be used.

Esthetic category 402 can include attributes related to the visual appeal of the photo. These attributes can be independent of the subject, and the ratings can be based on observations of human responses to various photos. For example, various esthetic attributes of a set of "training" photos can be rated by a team of human editors, and their ratings can be used to define a formula for rating other photos. Examples of esthetic attributes include: brightness attribute a1 (brighter photos are typically more appealing and can be given higher ratings); contrast attribute a2 (photos with areas of strong contrast are typically more appealing and can be given higher ratings): color diversity attribute a3 (range of colors, with a high range typically being more appealing and given a higher rating); and focus or sharpness of object edges attribute a4 (in-focus photos are generally more appealing).

Content category 404 can include attributes related to a subject identified in the photo. Subjects can be identified using image-analysis techniques that can recognize the presence of specific objects in an image based on properties of the image pixels. For example, numerous algorithms exist to identify areas of an image occupied by human faces, and attribute a5 can correspond to the percentage of the image area occupied by faces. Group photos or close-ups of a single person would tend to have a high percentage of coverage by faces, and photos of this kind can be given a higher rating for this attribute. Similarly, food items in images can be recognized (e.g., based on assumptions about plate shape and coloration, combined with contrast between the plate and the food on the plate), and attribute a6 can correspond to the percentage of image area occupied by food items. Similarly, the presence of text (words, letters, numbers) in an image can be detected based on edges, contrast, and patterns of light and dark (with or without attempting to interpret the specific text), and attribute a7 can be the percentage of image area occupied by text. In some embodiments, text-heavy images may be given a lower rating for attribute a7, as text-heavy images tend to be less visually appealing. Other commonly occurring objects that can be recognized in an image can also be used as the basis of a content attribute.

Another content-related attribute can be based on comparing photos to identify photos of the same subject. For example, users may take many photos of subjects they care about (e.g., family members, friends, pets). Regardless of whether the subject can be identified, characteristic pixel patterns for a subject can be identified and distinguished from other subjects. Accordingly, attribute a8 can be a measure of the frequency of occurrence of photos of the subject in the user's photo collection.

Location category 406 can include attributes related to information about where the photo was taken. Locations can be identified, e.g., based on location metadata embedded in the image files received at online content management service 100. Such metadata can be added automatically by the camera. For instance, a camera with a GPS receiver can determine GPS coordinates and include the GPS coordinates in the image metadata. In some instances, a user may be able to manually provide location metadata for a particular photo or group of photos. The location can be defined with varying levels of granularity; for instance, photos can be clustered based on similarity of location, and each cluster can be treated as having a single location for purposes of scoring photos.

Regardless of the source of location metadata or the precision with which location is identified, photos can be rated based on attributes derived from location metadata. For example, attribute a9 can be a measure of the frequency with which the user visits the location of the photo, which can be determined based on the relative numbers of photos from various locations in the user's collection of photos. Locations that are visited (or photographed) infrequently may be more interesting than those that are visited often, and the rating for attribute a9 can be defined accordingly (e.g., based on an inverse of the frequency). Similarly, attribute a10 can be a measure of the extent to which the user has a regular pattern of visiting (or photographing) the location, which can also be determined based on the user's collection of photos. For instance, if the user takes photos at a location at frequent and regular intervals (e.g., every day or every week), photos from the location might be less interesting to the user than photos from a location the user visits once a year or less frequently.

Attribute a11 can be a measure of the number of photos the user took while visiting the location. For example, a "visit" to a location can be defined by identifying a group of successive photos from the same location. If the user took a large number of successive photos at the location, or if the user took a large number of photos in a relatively short period of time, this can correspond to a high rating for attribute a11.

Time category 408 can include attributes related to annual patterns (or other temporal patterns) in the user's photo collection. For example, users might take photos each year at their children's birthday celebrations. A temporal pattern of clusters of photos taken at approximately one-year intervals can suggest a recurring event (such as a birthday celebration) that might be of interest to the user. Attribute a12 can be a measure of the extent to which the photo matches a recurring annual cluster observed in the user's photo collection.

Crowdsourcing category 410 can include attributes related to correlating the user's photos with the photography patterns of other users who have uploaded photos. For example, at a special event such as a concert, parade, or the like, many individuals are likely to be present and taking photos. By clustering each user's photos according to location and time, then correlating the clusters across users, it is possible to identify photos that are likely to be from a special event, and attribute a13 can be a measure of this likelihood (e.g., based on the number or fraction of users who took photos at the same or similar time and location). As another example, a tourist attraction (such as a national park) is likely to be a location where photos are taken by many users, although such photos may not cluster in time as is the case for special events. By identifying locations where many users take photos, it is possible to identify photos that are likely from a generally interesting location, and attribute a14 can be a measure of this likelihood.

In some embodiments, crowdsourcing can be based on correlated behavior of users who are acquainted with each other. For example, online content management service 100 may have information indicating that one user is acquainted with another. For instance, if the users have contact lists stored by online contact management service 100, the users may appear on each other's contact list. As another example, the users may have designated content items to be shared with each other, which would indicate that they are acquainted. Where acquaintance information is available for a user, correlations in location and time of photos between one user and her acquaintances may indicate that the photos would be of interest to the user, and attribute a15 can be a measure of the extent to which photos from the same location and time are present in collections of other users who are known acquaintances of the user whose photos are being rated.

History category 412 can include attributes related to previous user interactions with the photos. For example, attribute a16 can be assigned a value indicating whether the photo was automatically uploaded, uploaded from an email message, uploaded from a stored file, or the like. The specific values can be assigned, e.g., based on an assumption that photos the user made a specific choice to save are more likely of interest than automatically uploaded photos; thus, manual uploading may receive a higher rating. Attribute a17 can be a measure of whether (and with how many people) the user previously shared the photo. Photos that were previously shared may be more interesting in the context of a re-engagement message prompting the user to reminisce, but less interesting in the context of a re-engagement message prompting the user to share photos. Attribute a18 can be a measure of whether (and to what extent) the user has previously edited the photo, e.g., by applying filters or other editing algorithms, provided that editing information is available in the metadata.

Attribute a19 can be assigned a value indicating how the photo is stored in online content management service 100. For example, in some embodiments, photos collection 162 can include photos that are also stored among the user's other content items 158. A photo that is stored in a folder with non-photo documents (e.g., word processing files, spreadsheets or the like) may be less interesting for the user to recall than photos from a batch of photos that were saved together. Accordingly, a rating can be assigned based on how the photo is stored.

Attribute a20 can be assigned a value indicating whether the photo was previously sent to the user in a re-engagement message and what (if any) response was received. Photos that were sent and received a negative response can receive a lowest rating. Photos that were sent and received a positive response can receive a higher rating, and photos that were not previously sent can receive the highest rating. Alternatively, in some embodiments, the fact that a photo was previously sent to a user may be used to veto selecting that photo to be sent to the user again, in order to avoid repetitive messages. In still other embodiments, the veto may expire after some period of time (e.g., a year, two years, four years) so that old favorite photos can resurface in subsequent reengagement messages.

It will be appreciated that the attributes of FIG. 4 are illustrative and that variations and modifications are possible. Any attribute or combination of attributes can be defined and independently rated for a photo. For example, one attribute can be based on an express user rating of the photo if the user has the ability to rate photos; various rating systems can be used.

In some embodiments, ratings for at least some of the attributes can be determined once (e.g., the first time the photo is scored), and the rating can be stored. This can be particularly useful for attributes that are not expected to change over time or as the user uploads additional photos; examples include attributes in esthetic category 402 and content category 404 that depend only on the content of the particular photo being rated.

A scoring algorithm based on the attributes of FIG. 4 (and/or other attributes that may be defined) can combine the ratings across any or all of attributes a1-a20, e.g., using a weighted average, to determine a score for each photo. The weights can be chosen based on the correlation between a high rating for a particular attribute and positive user response. In some embodiments, some of the weights can be negative (e.g., if a high rating for a particular attribute correlates with negative user response) or zero (e.g., if the rating for a particular attribute does not correlate with user response).

Machine learning algorithms can be used to select and tune the weights. For example, as described above with reference to FIG. 2, re-engagement message 200 can include various options for the user to respond to the message, and such options can provide positive feedback (e.g., if the user selects link 216 to view more photos or link 222 to indicate a desire to receive further messages) or negative feedback (e.g., if the user selects link 224 to indicate a desire not to receive further messages). This feedback can provide the basis for a machine-learning process.

Figure 5:
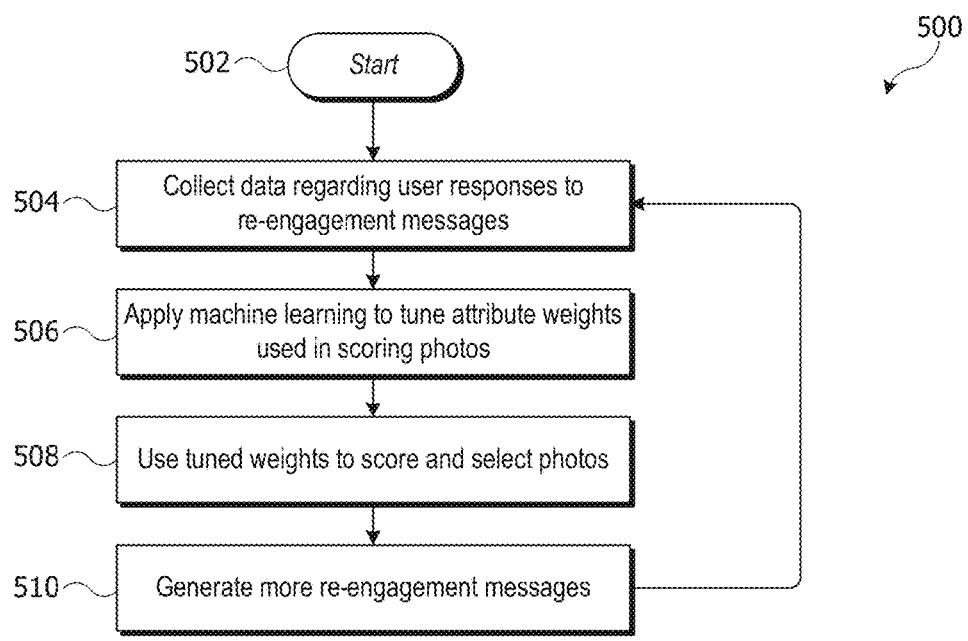
FIG. 5 is a flow diagram of a process that can be used to tune the weights assigned to the various attributes according to an embodiment of the present invention.

FIG. 5 is a flow diagram of a process 500 that can be used to tune the weights assigned to the various attributes according to an embodiment of the present invention. Process 500 can begin (block 502) after an initial set of re-engagement messages that include photos have been sent to a number of users, e.g., using process 300. For the initial set of messages, the scoring of photos at block 308 of process 300 can be done using untuned weights that can reflect initial assumptions about which attributes are likely to correlate with user interest. In some embodiments, most of the weights can be initially set to zero. For instance, the initial selection can be based on esthetics (e.g., attributes a1-a4 of FIG. 4) and time (e.g., attribute a12 of FIG. 4).

At block 504, process 500 can collect data regarding user responses to the re-engagement messages that were sent. For example, re-engagement message 200 of FIG. 2 can include links 216, 222, 224 that, when selected by the user, result in online content management service 100 receiving a content request or other notification of the user action. In addition, in some embodiments, online content management service 100 can automatically receive a notification when the user opens message 200; conventional or other notification techniques can be used. This can allow user responses to be normalized relative to the number of users who actually opened the re-engagement message. Feedback data can be classified as follows: (1) users who did not open the message; (2) users who opened the message but took no further action; (3) users who opened the message and engaged with the photo service (e.g., by clicking link 216); (4) users who opened the message and expressed approval (e.g., by clicking link 222); and (5) users who opened the message and expressed disapproval (e.g., by clicking link 224). In some embodiments, online content management service 100 can also define a sixth feedback classification, for instances where users engaged with their photo collection within a fixed period of time (e.g., 24 hours) after opening the re-engagement message but did so via some channel other than clicking a link in the message (e.g., the user might manually launch the client app on a device). Thus, in this example, there can be six different feedback classifications, which can be ranked on a spectrum from most positive (e.g., users who clicked link 216) to most negative (e.g., users who clicked link 224). Other embodiments can provide more or fewer classifications. For instance, a positive feedback classification can include all instances where the user clicked link 216, clicked link 222, or manually launched the photo client app within 24 hours after opening the re-engagement message; a negative feedback classification can include all instances where the user clicked link 224; and a neutral feedback classification can include all instances where the user opened the message but did not respond. In some embodiments, users who did not open the message can be ignored, or failure to open the message can be treated as a negative feedback classification.

At block 506, machine learning algorithms can be applied to tune the weights for the various attributes (e.g., any or all of attributes a1-a20 of FIG. 4). For example a conventional or other correlation-detection algorithm (e.g., a Bayesian classifier) can be applied to detect correlations that may exist between the feedback classification of a particular re-engagement message and the attributes (e.g., any or all of attributes a1-a20 of FIG. 4) of the photos included in the re-engagement message. Based on the correlations, the machine learning algorithm can assign weights can to the attributes such that the resulting score predicts the correct feedback classification; the reliability can be optimized using various techniques. In some embodiments, the feedback classification and weights can be designed such that high scores correlate with positive feedback classifications (e.g., user engaged with photos or otherwise indicated approval of the message) and low scores with negative feedback classifications (e.g., user did nothing or indicated disapproval of the message).

Thereafter, at block 508, the tuned weights can be used to score and select photos for a subsequent set of re-engagement messages (e.g., a subsequent iteration of process 300 of FIG. 3), which can be sent to users at block 510. Thus, the selection can be optimized to favor photos that are statistically more likely than others to elicit positive feedback from the user. Process 500 can iterate to provide a feedback loop, collecting additional feedback data and further tuning the weights as more re-engagement messages are sent. Over time, the weights may converge on an optimum set of values.

It will be appreciated that process 500 is illustrative and that variations and modifications are possible. Steps described as sequential may be executed in parallel, order of steps may be varied, and steps may be modified, combined, added or omitted. Feedback can be collected across any number of users. For instance, responses from all users can be aggregated, or the users can be subdivided based on various demographic categories for which sufficient information is available. Examples of demographic categories can include the user's age group, gender, and/or region of residence, as well as information about the user's behavior in relation to the online photo service (e.g., number of photos in the user's collection, number of photos added to the user's collection over a time period, elapsed time since the user last engaged with uploaded photos, etc.). In some embodiments, if multiple re-engagement messages are sent to the same user, patterns of responsiveness can be analyzed at the level of individual users to further tailor the selection of photos to the user's interests and response.

The feedback analysis of process 500 can be extended to other properties of the re-engagement messages. For example, user response may correlate (positively or negatively) with the number of photos included, and feedback can be used to tune the number of photos. User response may also correlate to varying degrees with the frequency of messages, the timing of messages (e.g., responsiveness may increase if messages are sent at times when users are likely to feel nostalgic, such as holidays or birthdays), esthetic characteristics of the message (e.g., colors, layouts, automated text, etc.), and so on. Process 500 can be used to detect these correlations as well and to adapt future re-engagement messages to increase the likelihood of positive user feedback.

While the invention has been described with respect to specific embodiments, one skilled in the art will recognize that numerous modifications are possible. For instance, although scoring algorithms described above are based on a weighted average of attributes, it is also possible to implement other scoring functions including non-linear functions. Parameters for scoring functions can be trained using machine learning and feedback as described above regardless of the particular form of the scoring function.

For example, in some embodiments, a subset of the user's photos is pre-selected for possible inclusion, and only photos that are selected are scored. In one example, pre-selection can be based on an "anniversary" model, in which photos that are closest to being exactly Y years old (for any integer Y) are pre-selected. This may be useful, for instance, for generating messages with a time-based theme such as "remember what you were doing a year ago?" (or five years ago, etc.). The pre-selected photos can be further scored based on esthetic attributes (e.g., some or all of attributes a1-a4 of FIG. 4) and/or other attributes described above.

In another example, a user's photo collection may include multiple similar-looking photos taken in the same location at around the same time. Pre-selection can include detecting clusters of such photos, for instance, by comparing their ratings on esthetic attributes and/or content attributes, as well as the location and time metadata. Where a cluster is detected, one photo (e.g., the photo in the cluster with highest ratings on esthetic attributes) can be selected as representative of the cluster. This can reduce the number of photos for which the full rating and scoring computations are performed, which can save computing resources. As noted above, it is also possible to score all the photos and perform deduplication during selection of photos to include in the message.

Figure 6:
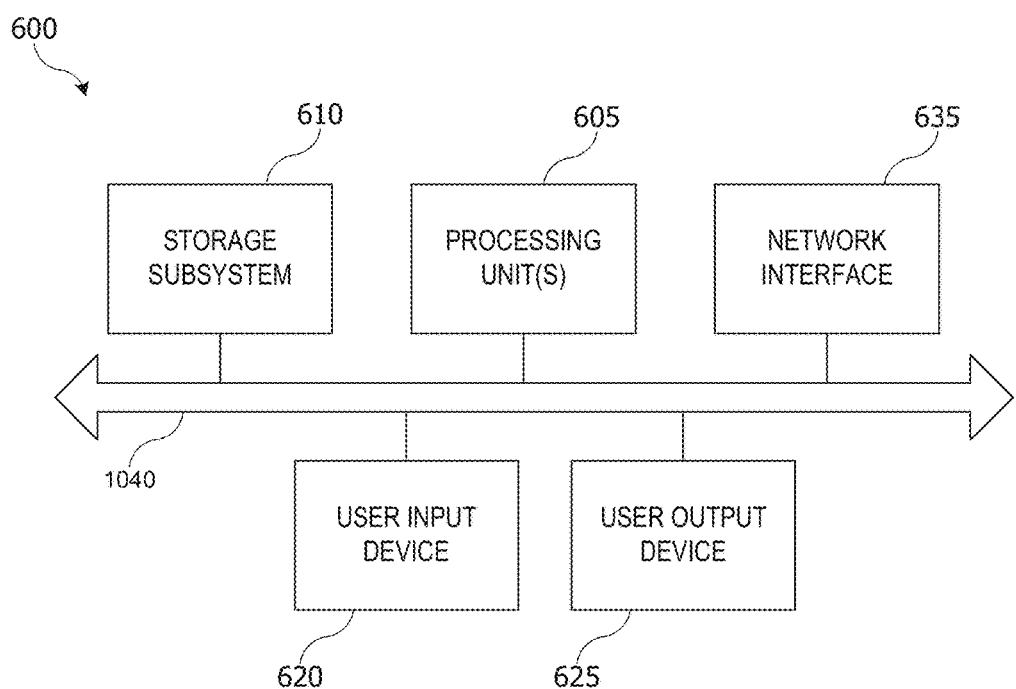
FIG. 6 shows a simplified block diagram of a representative computer system that can be used according to an embodiment of the present invention.

Various operations described herein can be implemented on computer systems, which can include systems of generally conventional design. FIG. 6 shows a simplified block diagram of a representative computer system 600. In various embodiments, computer system 600 or similar systems can implement a server system (e.g., all or part of servers 130 of FIG. 1) or a client device (e.g., any of client devices 112, 114, 116). Computer system 600 can include processing unit(s) 605, storage subsystem 610, input devices 620, output devices 625, network interface 635, and bus 640.

Processing unit(s) 605 can include a single processor, which can have one or more cores, or multiple processors. In some embodiments, processing unit(s) 605 can include a general-purpose primary processor as well as one or more special-purpose co-processors such as graphics processors, digital signal processors, or the like. In some embodiments, some or all processing units 605 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 605 can execute instructions stored in storage subsystem 610.

Storage subsystem 610 can include various memory units such as a system memory, a read-only memory (ROM), and a permanent storage device. The ROM can store static data and instructions that are needed by processing unit(s) 605 and other modules of computer system 600. The permanent storage device can be a read-and-write memory device. This permanent storage device can be a non-volatile memory unit that stores instructions and data even when computer system 600 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 605 need at runtime.

Storage subsystem 610 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 610 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 610 can store one or more software programs to be executed by processing unit(s) 605, such as an operating system, client interface programs, programs to generate re-engagement messages, client applications, and so on. "Software" refers generally to sequences of instructions that, when executed by processing unit(s) 605, cause computer system 600 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 605. Software can be implemented as a single program or a collection of separate programs or program modules that interact as desired. From storage subsystem 610, processing unit(s) 605 can retrieve program instructions to execute and data to process in order to execute various operations described herein.

A user interface can be provided by one or more user input devices 620 and one or more user output devices 625. Input devices 620 can include any device via which a user can provide signals to computer system 600; computer system 600 can interpret the signals as indicative of particular user requests or information. In various embodiments, input devices 620 can include any or all of a keyboard, track pad, touch screen, mouse or other pointing device, scroll wheel, click wheel, dial, button, switch, keypad, microphone, and so on.

User output devices 625 can include any device via which computer system 600 can provide information to a user. For example, user output devices 625 can include a display to display images generated by computer system 600. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touch screen that function as both input and output device. In some embodiments, other user output devices 625 can be provided in addition to or instead of a display. Examples include indicator lights, speakers, tactile "display" devices, printers, and so on.

In some embodiments, input device 620 and output devices 625 can interoperate to provide a graphical user interface ("GUI") that allows a user to interact with computer system 600 by using an input device to select a control element displayed on the screen (e.g., by operating a pointing device such as a mouse or touching the location where a control element is displayed on a touch screen).

Network interface 635 can provide voice and/or data communication capability for computer system 600, including the ability to communicate with various messaging services and/or message management services to access and act upon messages. In some embodiments, network interface 635 can include radio frequency (RF) transceiver components for accessing wireless voice and/or data networks (e.g., using cellular telephone technology; advanced data network technology such as 3G, 4G, or LTE, IEEE 802.11 family standards (e.g., Wi-Fi® standards promulgated by the Wi-Fi Alliance); Bluetooth® standards (promulgated by Bluetooth SIG); or other mobile communication technologies, or any combination thereof), GPS receiver components, and/or other components. In some embodiments, network interface 635 can provide wired network connectivity (e.g., Ethernet) in addition to or instead of a wireless interface. Network interface 635 can be implemented using a combination of hardware (e.g., antennas, modulators/demodulators, encoders/decoders, and other analog and/or digital signal processing circuits) and software components.

Bus 640 can include various system, peripheral, and chipset buses that communicatively connect the numerous components of computer system 600. For example, bus 640 can communicatively couple processing unit(s) 605 with storage subsystem 610. Bus 640 can also connect to input devices 620 and output devices 625. Bus 640 can also couple computing system 600 to a network through network interface 635. In this manner, computer system 600 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 605 can provide various functionality for computer system 600. For example, computer system 600 can execute any and all of the processes described above to determine scores for photos, generate re-engagement messages, and tune photo scoring parameters (e.g., attribute weights) based on the response.

It will be appreciated that computer system 600 is illustrative and that variations and modifications are possible. Computer system 600 can have other capabilities not specifically described here (e.g., mobile phone, global positioning system (GPS), power management, one or more cameras, various connection ports for connecting external devices or accessories, etc.). Further, while computer system 600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer implemented method comprising:
   storing, at a server, a plurality of photos belonging to a user;
   determining, by the server, a set of photo scoring rules, wherein the set of photo scoring rules score photos based on a set of attributes for each photo and a user-specific set of weights corresponding to the set of attributes, wherein the user-specific set of weights is individually associated with the user;
   assigning, by the server, a score to each of the plurality of photos, the score being determined by the set of photo scoring rules;
   selecting, by the server, a first photo from the plurality of photos belonging to the user, the selection being based on a score assigned to the first photo according to attributes of the first photo and the user-specific set of weights;
   sending, by the server, a first re-engagement message to a client device associated with the user, the first re-engagement message comprising the first photo;
   determining a user response to the first re-engagement message;
   based on the user response to the first re-engagement message and the attributes of the first photo, modifying the user-specific set of weights to generate an updated user-specific set of weights;
   modifying, by the server, the photo scoring rules to create an updated set of photo scoring rules, wherein the updated set of photo scoring rules reflect the updated-user specific set of weights;
   selecting a second photo from the plurality of photos belonging to the user, the selection of the second photo being based a score assigned to the second photo according to the updated set of photo scoring rules; and
   sending a second re-engagement message to the client device associated with the user, the second re-engagement message comprising the second photo.

2. The method of claim 1 further comprising:
   detecting a pattern of user inactivity with regard to the plurality of photos belonging to the user, wherein sending the first re-engagement message occurs in response to detecting the pattern of user inactivity.

3. The method of claim 1, wherein modifying the user-specific set of weights to generate the updated user-specific set of weights is based at least in part on a trained machine learning algorithm.

4. The method of claim 1, further comprising analyzing each photo of the plurality of photos to identify the set of attributes of each photo, wherein the set of attributes of each photo comprises at least two of:
   an esthetic attribute based on an image characteristic of the photo;
   a location attribute based on location metadata indicating where the photo was taken;
   a temporal attribute based on temporal metadata indicating when the photo was taken; or a content attribute based on a subject identified in the photo.

5. The method of claim 1, wherein the attributes of the first photo include a location related attribute based on a pattern of the user visiting a location where the first photo was taken.

6. The method of claim 1, wherein the attributes of the first photo include a location related attribute based on a pattern of a number of users visiting a location where the first photo was taken.

7. The method of claim 1, wherein selecting the first photo comprises:
   selecting a set of highest scoring photos based on the score of each photo of the plurality of photos;
   determining whether one photo of the set of highest scoring photos is a duplicative photo of another photo of the set of highest scoring photos; and
   removing the duplicative photo from the set of highest scoring photos.

8. The method of claim 1, wherein selecting the first photo comprises:
   identifying a subject depicted in the photo; and
   assigning, to the first photo, an attribute rating related to the user's interest in the subject depicted in the photo.

9. A computer system comprising:
   at least one processor; and
   a non-transitory computer readable storage medium storing instructions thereon that, when executed by the at least one processor, cause the computer system to:
   identify a user from a plurality of users as an inactive user;
   determine a set of photo scoring rules, wherein the set of photo scoring rules score photos based on a set of attributes for each photo and a user-specific set of weights corresponding to the set of attributes, wherein the user-specific set of weights is individually associated with the user;
   assign a score to a plurality of photos belonging to the user, the score for each photo being determined by the set of photo scoring rules;
   select a first photo from the plurality of photos belonging to the user, the selection being based on a score assigned to the first photo according to attributes of the first photo and the user-specific set of weights;
   send a first re-engagement message to a client device associated with the user, the first re-engagement message comprising the first photo;
   determine a user response to the first re-engagement message;
   based on the user response to the first re-engagement message and the attributes of the first photo, modify the user-specific set of weights to generate an updated user-specific set of weights;
   modify the photo scoring rules to create an updated set of photo scoring rules, wherein the updated set of photo scoring rules reflect the undated-user specific set of weights;
   select a second photo from the plurality of photos belonging to the user, the selection of the second photo being based a score assigned to the second photo according to the updated set of photo scoring rules; and
   send a second re-engagement message to the client device associated with the user, the second re-engagement message comprising the second photo.

10. The computer system of claim 9, wherein identifying the user as an inactive user comprises determining, based on a user activity log, that the user has not used a client app to interact with the plurality of photos belonging to the user for at least a minimum time period.

11. The computer system of claim 9, wherein determining the user response to the first re-engagement message comprises classifying the user response as positive when, within a defined time period after receiving the first re-engagement message, the user launches a photo client app that provides a user interface to view the first photo.

12. The computer system of claim 9, wherein the set of attributes of each photo comprises at least two of:
   an esthetic attribute based on an image characteristic of the photo;
   a location attribute based on location metadata indicating where the photo was taken;
   a temporal attribute based on temporal metadata indicating when the photo was taken; or
   a content attribute based on a subject identified in the photo.

13. The computer system of claim 9, wherein selecting the first photo comprises:
   selecting a set of highest scoring photos based on the score of each photo of the plurality of photos;
   determining whether one photo of the set of highest scoring photos is a duplicative photo of another photo of the set of highest scoring photos; and
   removing the duplicative photo from the set of highest scoring photos.

14. The computer system of claim 9, wherein selecting the first photo comprises:
   identifying a subject depicted in the photo; and
   assigning, to the first photo, an attribute rating related to the user's interest in the subject depicted in the photo.

15. A non-transitory computer readable storage medium storing instructions thereon that, when executed by at least one processor, cause a computer device to:
   identify, as an inactive user, a user who has previously uploaded a plurality of photos to a server storage system but who has not interacted with the plurality of photos for at least a minimum time period;
   determine a set of photo scoring rules, wherein the set of photo scoring rules score photos based on a set of attributes for each photo and a user-specific set of weights corresponding to the set of attributes, wherein the user-specific set of weights is individually associated with the user;
   assign a score to at least some of the photos that were previously uploaded by the user, the score for each photo being determined by the set of photo scoring rules;
   select a first photo from the plurality of photos belonging to the user, the selection being based on a score assigned to the first photo according to attributes of the first photo and the user-specific set of weights;
   send a re-engagement message to a client device associated with the user, the first re-engagement message comprising the first photo;
   determine a user response to the first re-engagement message;
   based on the user response to the first re-engagement message and the attributes of the first photo, modify the user-specific set of weights to generate an updated user-specific set of weights;
   modify the photo scoring rules to create an updated sot of photo scoring rules, wherein the updated set of photo scoring rules reflect the updated-user specific set of weights;

select a second photo from the plurality of photos belonging to the user, the selection of the second photo being based on a score assigned to the second photo according to the updated set of photo scoring rules; and send a second re-engagement message to the client device associated with the user, the second re-engagement message comprising the second photo.

16. The non-transitory computer readable storage medium of claim 15, wherein determining the user response to the first re-engagement message comprises classifying the user response as positive when, within a defined time period after receiving the first re-engagement message, the inactive user launches a photo client app that provides a user interface to view one or more of the plurality of photos.

17. The non-transitory computer readable storage medium of claim 15, wherein selecting the first photo comprises:

selecting a set of highest scoring photos;

determining whether one photo of the set of highest scoring photos is a duplicative photo of another photo of the set of highest scoring photos; and removing the duplicative photo from the selected set of highest scoring photos.

18. The non-transitory computer readable storage medium of claim 15, wherein the attributes of the first photo comprise a location related attribute based on a pattern of the user taking photos at a location where the first photo was taken.

19. The non-transitory computer readable storage medium of claim 15, wherein selecting the first photo comprises:

identifying a subject depicted in the photo; and assigning, to the first photo, an attribute rating related to the user's interest in the subject depicted in the photo.

20. The non-transitory computer readable storage medium of claim 15, wherein the attributes of the first photo include a location related attribute based on a pattern of a number of users visiting a location where the first photo was taken.

* * * * *